March 9, 1926.
G. FORTIN
1,576,320
SAFETY LOCK FOR AUTOMOBILES
Filed June 18, 1925  3 Sheets-Sheet 1
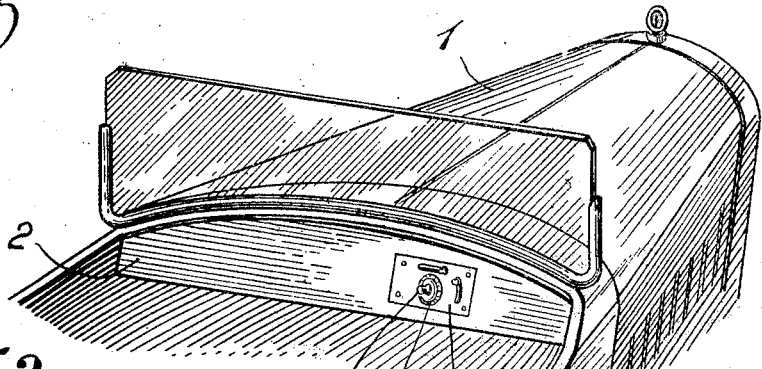
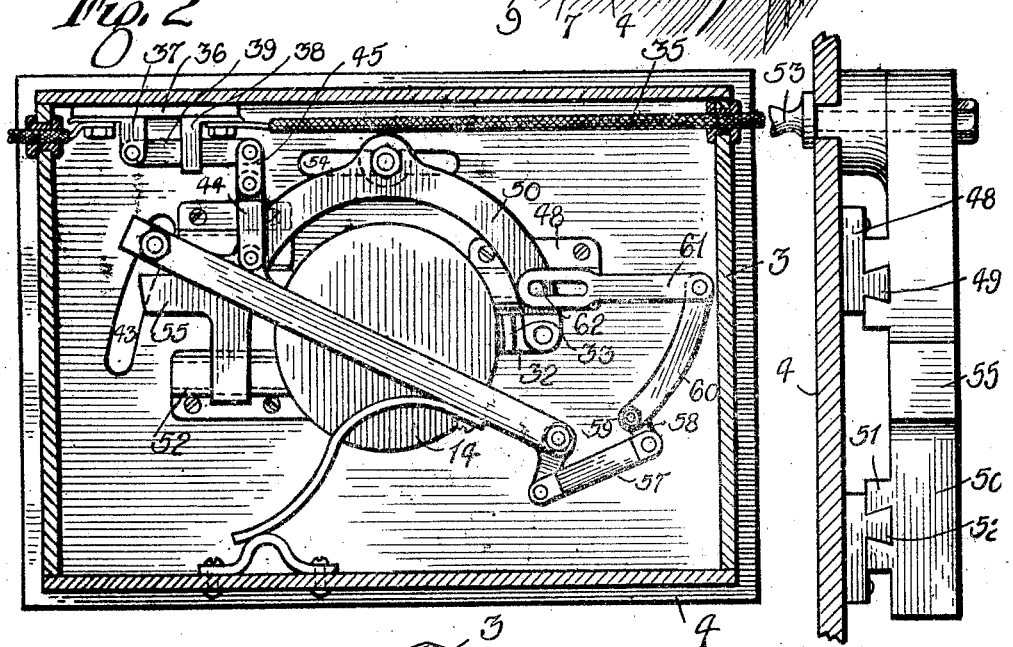
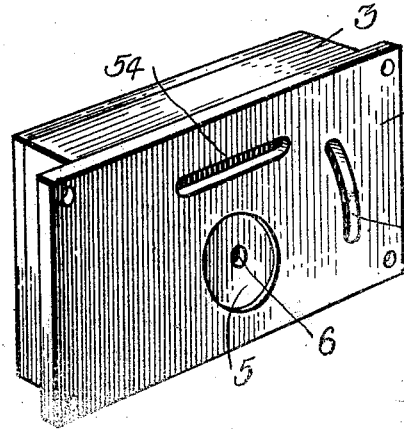
Inventor
Georges Fortin
By William Clinton
Attorney

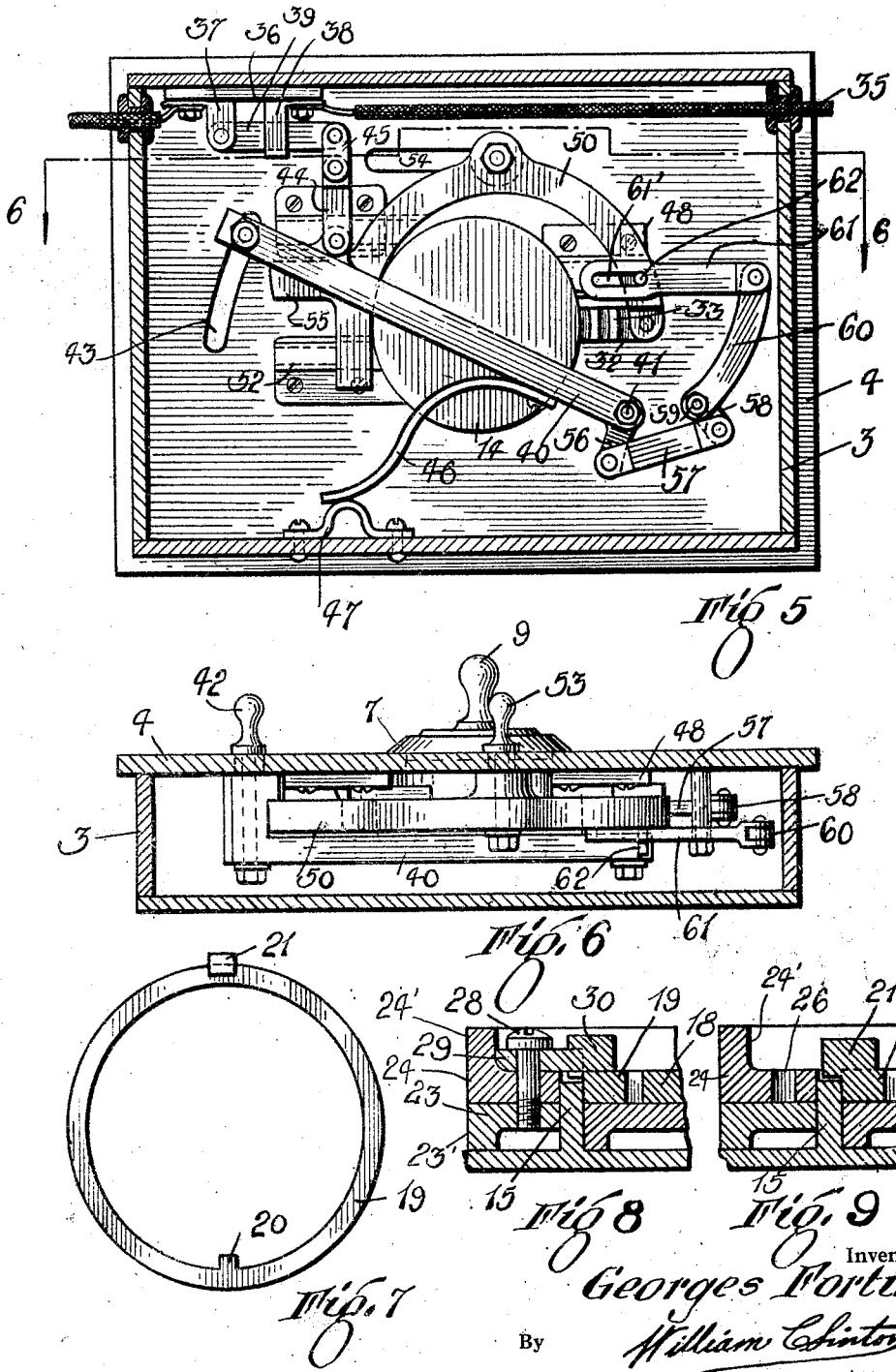

March 9, 1926.
G. FORTIN
SAFETY LOCK FOR AUTOMOBILES
Filed June 18, 1925
1,576,320
3 Sheets-Sheet 3
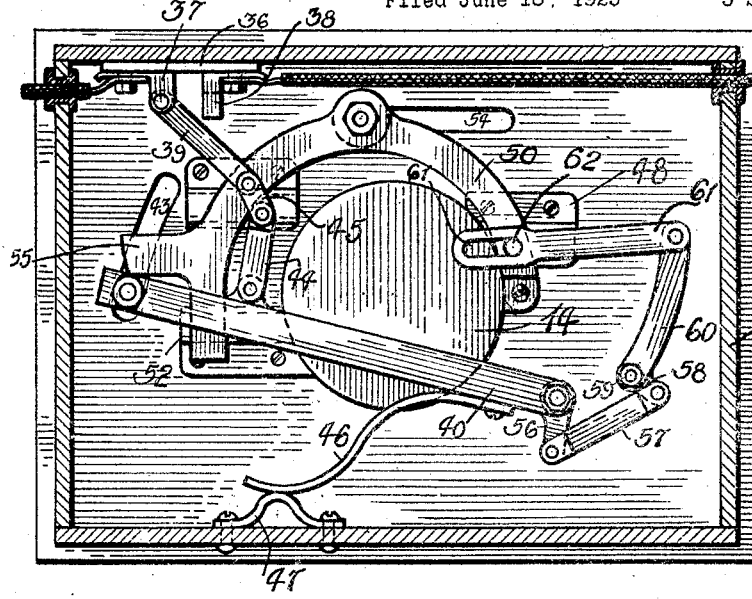
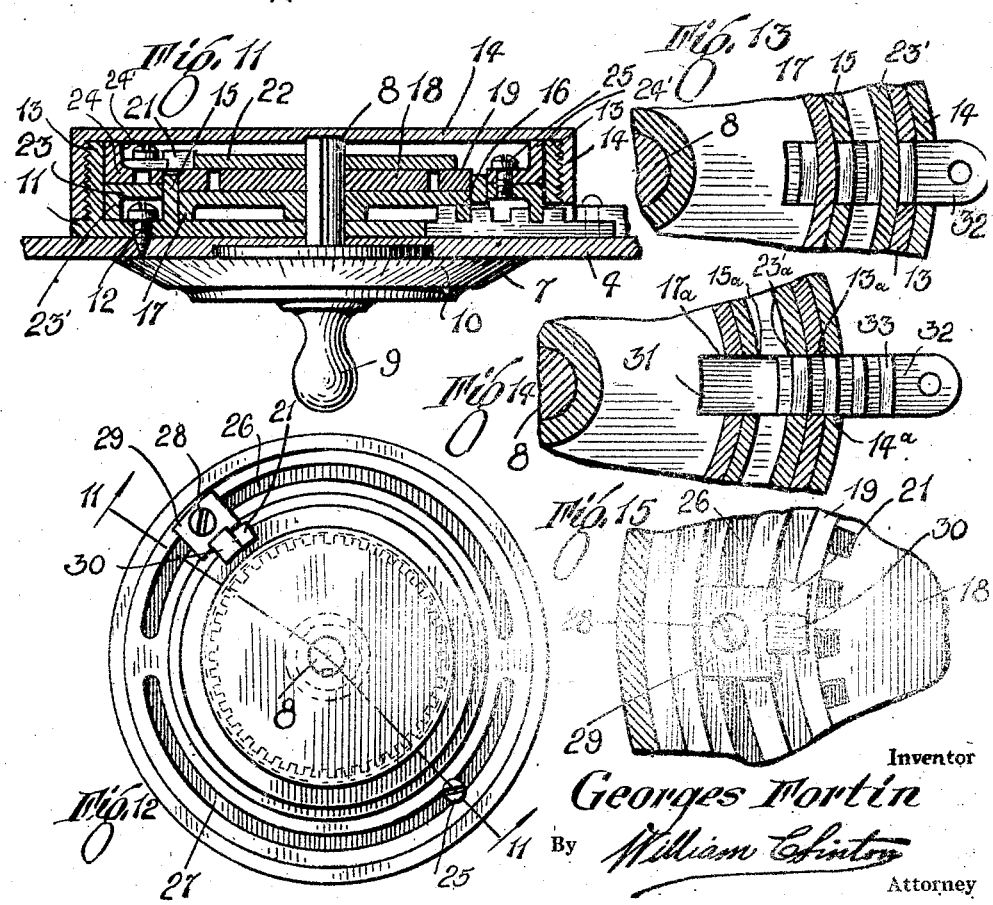
Inventor
Georges Fortin
By William Clinton
Attorney Patented Mar. 9, 1926.

1,576,320

UNITED STATES PATENT OFFICE.

GEORGES FORTIN, OF QUEBEC, QUEBEC, CANADA, ASSIGNOR OF ONE-HALF TO ADJUTOR BRULOTTE, OF QUEBEC, CANADA.

SAFETY LOCK FOR AUTOMOBILES.

Application filed June 18, 1925. Serial No. 38,070.

*To all whom it may concern:*

Be it known that I, GEORGES FORTIN, subject of the King of Great Britain, residing at Quebec, Province of Quebec, Canada, have invented certain new and useful Improvements in Safety Locks for Automobiles; and I do hereby declare that the following is a full, clear, and exact description of the invention, such as will enable others skilled in the art to which it appertains to make and use the same.

The present invention pertains to a novel safety lock for automobiles designed to control a switch in the magneto circuit.

The principal object of the invention is the provision of a device of this character whereby the switch may be locked in open position in order to prevent unauthorized starting of the car. In the accomplishment of this object there is provided on the dashboard a housing through which the magneto conductor is passed. In the conductor and within the housing is disposed the switch controlling the magneto circuit. The housing also contains a lever for opening the switch from the exterior of the housing, and this lever is operatively connected to a slide which brings an obstructing member into the path of the lever to prevent the latter from being returned to close the switch. A permutation lock is mounted within the housing, and the bolt thereof is connected to the slide. Consequently, when the obstructing member is brought into the path of the lever in the manner outlined, it may be locked in this position so that the obstruction cannot be removed without knowledge of the combination of the lock.

The invention is fully disclosed in the following description and in the accompanying drawings in which:

Figure 1 is a perspective view of an automobile showing the device of the invention applied thereto;

Figure 2 is a longitudinal section of the device of the invention, showing the position of parts when the car is running;

Figure 3 is an end view taken inside the housing of the device;

Figure 4 is a perspective view of the device;

Figure 5 is a sectional view similar to Figure 2 but showing the position of parts prior to opening the switch;

Figure 6 is a section on the line 6—6 of Figure 5;

Figure 7 is a plan view of the ring in the lock;

Figures 8 and 9 are fragmentary diametrical sections in different planes, of the locking mechanism;

Figure 10 is a section similar to Figures 2 and 5, showing the switch locked in open position;

Figure 11 is a complete diametrical section of the lock, on the line 11—11 of Figure 12;

Figure 12 is a plan view of the lock with the casing thereof removed;

Figures 13 and 14 are fragmentary longitudinal sections of the lock taken by the bolt and showing the latter in locked and release positions respectively; and Figure 15 is a fragmentary longitudinal section taken over the toothed wheel.

Reference to these views will now be made by use of like characters which are employed to designate corresponding parts throughout.

In Figure 1 the numeral 1 indicates an automobile having a dash-board 2 in the usual manner. In the dash-board is inserted the device of the invention which comprises a box-like housing 3 having its front wall 4 lying in the plane of the dash-board. The wall 4 is formed with a circular seat 5 having an aperture 6 in its centre. The seat receives the outer disc 7 of a permutation lock (Figure 11) while the spindle 8 of the lock passes through the aperture 6 and into the interior of the housing. The spindle 8 is provided at its outer end with an operating knob 9, and between the knob and disc is mounted a graduated dial 10 on the spindle and adapted to co-operate with appropriate markings on the wall 4 in a manner already well known in the art.

The lock consists of a base 11 secured to the inner face of the wall 4 by means of screws 12. This base is formed with a circular wall 13 which is threaded on its outer surface for the reception of a suitable cap or lock casing 14 which is applied after the interior mechanism of the lock has been assembled. The inner end of the spindle 8 is journaled in the cap as clearly illustrated in Figure 11. The base is also formed with a rib 15 which lies inside the wall 13 and has the spindle 8 at its centre. Within this rib is disposed a circular plate 16 having a forwardly extending flange 17 which rides on the base 11 and holds the plate spaced therefrom. At the outer face of the plate is mounted a toothed wheel 18 surrounded by a ring 19 also lying on the plate. The ring has an inwardly projecting tooth 20 and an outwardly extending lug 21 at diametrically opposite points. The tooth 20 is permanently received in one of the notches of the toothed wheel and may have its position changed for altering the combination of the lock. Finally, a disc 22 is mounted over the gear and ring in order to hold together the parts of the lock already mentioned.

In the annular space between the wall 13 and rib 15 are mounted a pair of collars 23 and 24 which are held to one another by means of screws 25. The lower collar 23 has a flange 23' engaging the base 11, while the remaining collar has a similar flange 24' engaging the flat wall of the casing 14. The upper collar is formed with a pair of arcuate slots 26 and 27 lying in the same circle as shown in Figure 12. Through one of the slots is passed a screw 28 entering the lower collar 23 (Figure 8) and holding a block 29 upon the other collar 24. From this block projects an ear 30 which lies in the circular path of the lug 21.

The base 11 has a slot 31 in which slides a bolt 32. The cylindrical members 17, 15, 23', 13 and wall of the casing 14 have slots 17ª, 15ª, 23'ª, 13ª and 14ª respectively of the same width as the slot 31 and adapted to be brought into alinement and over the latter to permit passage of teeth 33 on the bolt 32 and consequently to permit movement of the bolt.

In the operation of the lock the combination being known, the first movement of the knob 9 is to turn the toothed wheel 18 which carries the ring 19 so that the lug 21 of the latter engages the ear 30 and moves the two collars 23 and 24. In this manner the slot 23'ª in the flange 23' is brought over the slot 31. The knob is now turned in the opposite direction whereby the lug 21 is moved away from the ear 30 without affecting the position of the slot 23'ª. This movement however turns the plate 16 to bring the slot 17ª over the slot 31 and in alinement with the slot 23'ª already adjusted. The fixed members 15, 13 and 14 are obviously adjusted so that their slots are permanently disposed over the slot 31. When the combination has been established in the manner described, the bolt 32 is free to move. Otherwise, with either of the members 17 or 23' disposed over the slot 31, movement of the bolt is obstructed.

The conductor 35 running to the magneto is passed through the housing 3 as clearly shown in Figures 2, 5, and 10. This conductor has a break within the housing in which is disposed the switch comprising a base 36 carrying a post 37 and a clip 38. To the post is pivoted a switch blade 39 adapted to enter the clip 38, and thereby closes the break.

Within the housing, a lever 40 is pivoted to the front wall 4 at a fixed point 41. The free end of the lever carries a knob 42 which projects through a slot 43 to the exterior of the housing. The lever is connected to the switch blade 39 by a pair of links 44 and 45 so that the lever controls the switch. The lever is normally held raised to closing position by means of a spring 46 bearing against it and also against a lug 47 secured to the wall of the housing.

To the inner face of the wall 4 are secured a plurality of guide blocks 48 surrounding the lock casing 14. Each such block has a tenon 49 as shown in Figure 3. Over these blocks is mounted a slide 50 in the shape of a yoke and having a plurality of abutments 51 formed with dovetail grooves 52 in which the tenons 49 are received. In this manner the slide is supported for movement longitudinally of the housing 3. The slide also carries a knob 53 projecting through a slot 54 to the exterior of the housing whereby it may be actuated directly if desired. One end of the slide is connected to the lock bolt 32 while the other end carries a finger 55 adapted to be moved over the slot 43 and into the path of the lever 40 as illustrated in Figures 2 and 10.

The pivoted end of the lever 40 has fixed thereto a straight link 57. This link is also connected to another arm 58 which is pivoted to a fixed point 59 on the inner face of the wall 4. At this pivot point, a curved link 60 is attached to the arm 58, and the free end of the latter is pivoted to a slotted link 61. On the slide 50 is mounted a pin 62 which extends into the slot 61' of the link 61.

When current is to be supplied to the magneto in the running of the automobile, the switch is closed as in Figure 2. In this position the finger 55 lies over the slot 43 in order to prevent retraction of the lever 40 and opening of the switch. After the automobile has been stopped and it is desired to open the switch, the slide 50 is moved by means of the knob 53 to the position shown in Figure 5 in order to remove the finger 55 from the path of the lever. The lever is now brought downwardly by means of the knob 42, the lock being at this time in open position as shown in Figure 15. Upon turning of the lever about its pivot, the link 57 is shifted, causing rotation of the arm 58 and the curved link 60 attached thereto. The slotted link 61 is thereby removed towards the lock whereby the bolt 32 is inserted in the lock and the finger 55 brought over the slot 43 to prevent return of the lever. The lock is now set to the position shown in Figure 13 to hold the bolt within the lock, so that the lever cannot be returned to close the switch unless the lock is opened by use of the proper combination. The position of parts when the switch is held open is shown in Figure 10. It will be apparent that the foregoing constitutes an effective device for preventing theft of the automobile, since the magneto circuit cannot be closed without knowledge of the combination of the lock.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A circuit control device comprising in combination with a housing and a switch mounted therein, a lever pivoted in said housing and connected to the blade of the switch, a slide mounted in said housing and operable by said lever, an obstructing member carried by said slide and adapted to enter the path of said lever, a lock attached to said housing, and a bolt connected to said slide and adapted to enter said lock.

2. A circuit control device comprising in combination with a housing and a switch mounted therein, a lever pivoted in said housing and connected to the blade of the switch, a slide mounted in said housing and operable by said lever, an obstructing member carried by said slide and adapted to enter the path of said lever, a lock attached to said housing, a bolt connected to said slide and adapted to enter said lock, a knob carried by said slide and extending to the exterior of the housing for independent actuation of said slide 3. A circuit control device comprising in combination with a housing and a switch mounted therein, a lever pivoted in said housing and connected to the blade of said switch, a yoke slidably mounted in the housing and operatively connected to said lever and a finger carried by said yoke and adapted to enter the path of said lever.

4. A circuit control device comprising in combination with a housing and a switch mounted therein, a lever pivoted in said housing and connected to the blade of said switch, a yoke slidably mounted in the housing and operatively connected to said lever, a finger carried by said yoke and adapted to enter the path of said lever, a lock attached to said housing, and a bolt connected to said yoke and adapted to enter said lock.

5. A circuit control device comprising in combination with a housing and a switch mounted therein, a lever pivoted in said housing and connected to the blade of said switch, a yoke slidably mounted in the housing and operatively connected to said lever, a finger carried by said yoke and adapted to enter the path of said lever, a knob carried by said yoke and extending to the exterior of said housing for independent actuation of said yoke.

6. A circuit control device comprising in combination with a housing and a switch mounted therein, a lever pivoted in said housing and connected to the blade of said switch, a yoke slidably mounted in the housing and operatively connected to said lever, a finger carried by said yoke and adapted to enter the path of said lever, a lock attached to said housing, a bolt connected to said yoke and adapted to enter said lock, a knob carried by said yoke and extending to the exterior of said housing for independent actuation of said yoke.

7. A circuit control device comprising in combination with a housing and a switch mounted therein, a lever pivoted in said housing, a link connection between said lever and the blade of said switch, a slide mounted in said housing and operatively connected to said lever, and a finger carried by said slide and adapted to enter the path of said lever.

8. A circuit control device comprising in combination with a housing and a switch mounted therein, a lever pivoted in said housing, a link connection between said lever and the blade of said switch, a slide mounted in said housing and operatively connected to said lever, a finger carried by said slide and adapted to enter the path of said lever, a lock attached to said housing, and a bolt connected to said slide and adapted to enter said lock.

9. A circuit control device comprising in combination with a housing and a switch mounted therein, a lever pivoted in said housing, a link connection between said lever and the blade of said switch, a slide mounted in said housing and operatively connected to said lever, a finger carried by said slide and adapted to enter the path of said lever, a knob carried by said slide and extending to the exterior of the housing for independent actuation of said slide.

10. A circuit control device comprising in combination with a housing and a switch mounted therein, a lever pivoted in said housing, a link connection between said lever and the blade of said switch, a slide mounted in said housing and operatively connected to said lever, a finger carried by said slide and adapted to enter the path of said lever, a lock attached to said housing, a bolt connected to said slide and adapted to enter said lock, a knob carried by said slide and extending to the exterior of the housing for independent actuation of said slide.

In witness whereof I have hereunto set my hand.

GEORGES FORTIN.